Patented Apr. 7, 1931

1,800,187

UNITED STATES PATENT OFFICE

MAX C. BAUMANN, OF COBURG, GERMANY

ARTIFICIAL SNOW AND PROCESS FOR MAKING THE SAME

No Drawing. Application filed October 1, 1928, Serial No. 309,680, and in Germany June 21, 1928.

The present invention relates to the preparation of a mass very similar to natural snow in its appearance. The new product is particularly suitable for decorating Christmas trees. The known snow imitations hitherto used for this purpose consist in general of wadding-preparations which, naturally, produce only a very incomplete illusion of real snow. The same applies also to masses of imperfectly crystallized mineral substances such as zinc oxide or magnesium carbonate, which have already been proposed for the present purpose.

For the preparation of the new masses on the other hand, substances having a high crystallizing power are employed, especially such as readily crystallize in long needles. The high refractivity of such natural crystals produces a strongly glittering effect. Both these properties cause the appearance of natural snow to be imitated in a manner extremely true to life.

Substances such as benzoic acid, salicylic acid or a crystalline powder of potash alum, if desired mixtures of a few or all of these substances, may be suitably employed. Substances such as benzoic acid may, if desired, be subjected to a previous sublimation process.

In order to enable such crystal compounds to adhere to the branches and needles of the trees, these substances are preferably mixed, before their application, with binding agents. In this connection sugar-like substances or allied carbohydrates, the adhesive properties of which are known, are particularly suitable, for example, ordinary cane sugar, starch or starch-containing substances such as potato flour and dextrin and the like. Similarly extracts of mucillaginous plants and mosses such, for example, as tragacanth, gum arabic or a decoction of caragheen moss may be employed, as well as natural latex or the various kinds of gum. Glue and gelatine may also be used as binding agents.

The application of the described masses to the tree may, for example, be effected by first moistening the tree with water and then dusting it with a dry mixture of the aforementioned substances. A sieve is preferably used for the purpose.

Example

2½ parts sugar, 2 parts potato flour, 1½ parts benzoic acid, 1 part salicylic acid, 4 parts crystalline powder of potash alum are mixed together in a dry condition. This powder is then applied in a dry condition, for example by means of a sifter on to the tree which has been moistened with the aid of an atomizer or sprayer. After the powder has been applied the tree may be again sprayed with water in order to effect a better crystalline formation after the application.

In place of the process just described the mixture may be previously treated with water until it has a paste-like consistency. An imitation snow mass of this kind may, for example, consist of a strong sugar solution into which sublimed benzoic acid is introduced until the mass possesses the desired paste-like consistency. In order to effect a homogeneous mixture of the constituents, the whole may be triturated in a mortar or be ground in mills, such as a colloidal mill. In this way a snow-white tough mass, which somewhat resembles whipped cream or a strong lather of soap is obtained. This mass may be applied to the dry branches of the fir tree to be decorated in any manner, for example with the aid of a brush. If desired, both methods of application described above may be combined one with the other, by first spreading a preliminary coating of the described snow paste to the branches and then dusting the tree once again with the dry snow powder.

The new imitation snow-mass has the advantage of adhering extremely fast and the tree prepared therewith outwardly completely resembles a snow covered forest tree. The mass is non-poisonous and non-inflammable. The inflammability of the tree treated in the described manner is in fact diminished as the said substances are only slightly inflammable or non-inflammable. Furthermore, the new product has a preserving action on the Christmas tree which has been separated from its roots and causes the needles of the tree to adhere for a long time and not to fall off so rapidly as otherwise generally happens.

The thickness of the coating is left to personal taste. Should it be desired, the mass may easily have the most varied colors imparted to it, whereby novel decoration effects are obtained. Scents may also be incorporated with the mass, especially those, such as an extract of pine needles or the like, which increase the natural smell of the tree.

The described artificial mass may also be used as such for other purposes of decoration of any description, for example for theatrical scenery and the like.

I claim:—

1. A process for preparing a mass closely resembling natural snow in appearance which consists in mixing white readily crystallizable organic acids with light colored organic binding agents of an adhesive nature.

2. A process for preparing a mass closely resembling natural snow in appearance which consists in mixing benzoic acid with light colored organic binding agents of an adhesive nature.

3. A process for preparing a mass closely resembling natural snow in appearance which consists in mixing salicylic acid with light colored organic binding agents of an adhesive nature.

4. A process for preparing a mass closely resembling natural snow in appearance which consists in mixing white crystallizable organic acids and white crystallizable inorganic salts with light colored organic binding agents of an adhesive nature.

5. A process for preparing a mass closely resembling natural snow in appearance which consists in mixing benzoic acid and white crystallizable inorganic salts with light colored organic binding agents of an adhesive nature.

6. A process for preparing a mass closely resembling natural snow in appearance which consists in mixing salicylic acid and white crystallizable inorganic salts with light colored organic binding agents of an adhesive nature.

7. A process for preparing a mass closely resembling natural snow in appearance which consists in mixing benzoic acid and potash alum with light colored organic binding agents of an adhesive nature.

8. A process for preparing a mass closely resembling natural snow in appearance which consists in mixing salicylic acid and potash alum with light colored organic binding agents of an adhesive nature.

9. A process for preparing a mass closely resembling natural snow in appearance which consists in mixing white readily crystallizable organic acids with carbohydrate-containing binding agents.

10. A process for preparing a mass closely resembling natural snow in appearance which consists in mixing benzoic acid with carbohydrate-containing binding agents.

11. A process for preparing a mass closely resembling natural snow in appearance which consists in mixing salicylic acid with carbohydrate-containing binding agents.

12. A process for preparing a mass closely resembling natural snow in appearance which consists in mixing white readily crystallizable organic acids and white crystallizable inorganic salts with carbohydrate-containing binding agents.

13. A process for preparing a mass closely resembling natural snow in appearance which consists in mixing benzoic acid and white crystallizable inorganic salts with carbohydrate-containing binding agents.

14. A process for preparing a mass closely resembling natural snow in appearance which consists in mixing salicylic acid and white crystallizable inorganic salts with carbohydrate-containing binding agents.

15. A process for preparing a mass closely resembling natural snow in appearance which consists in mixing benzoic acid and potash alum with carbohydrate-containing binding agents.

16. A process for preparing a mass closely resembling natural snow in appearance which consists in mixing salicylic acid and potash alum with carbohydrate-containing binding agents.

17. A process for preparing a mass closely resembling natural snow in appearance comprising the step of mixing benzoic acid, salicylic acid and potash alum with carbohydrate-containing binding agent, all in dry condition.

18. A process for preparing a mass closely resembling natural snow in appearance comprising the step of mixing benzoic acid, salicylic acid and potash alum with sugar and potato flour all in dry condition.

19. A product resembling natural snow comprising a mixture of at least a readily crystallizable organic acid and an adhesive agent.

20. A product resembling natural snow comprising a dry mixture of at least a readily crystallizable organic acid and an adhesive agent.

21. A paste-like product resembling natural snow comprising a mixture of a white readily crystallizable substance and a solution of an adhesive agent.

22. A paste-like product resembling natural snow comprising at least an organic acid intimately mixed with a solution of a carbohyrate.

23. A dry mixture resembling snow comprising 2½ parts of at least one organic acid, 2½ parts of sugar, 2 parts of flour and 4 parts of crystalline powder of potash alum.

In testimony whereof I affix my signature.

MAX C. BAUMANN.